John H. Gerber
Inventor

By Eaton + Brown
Attorneys

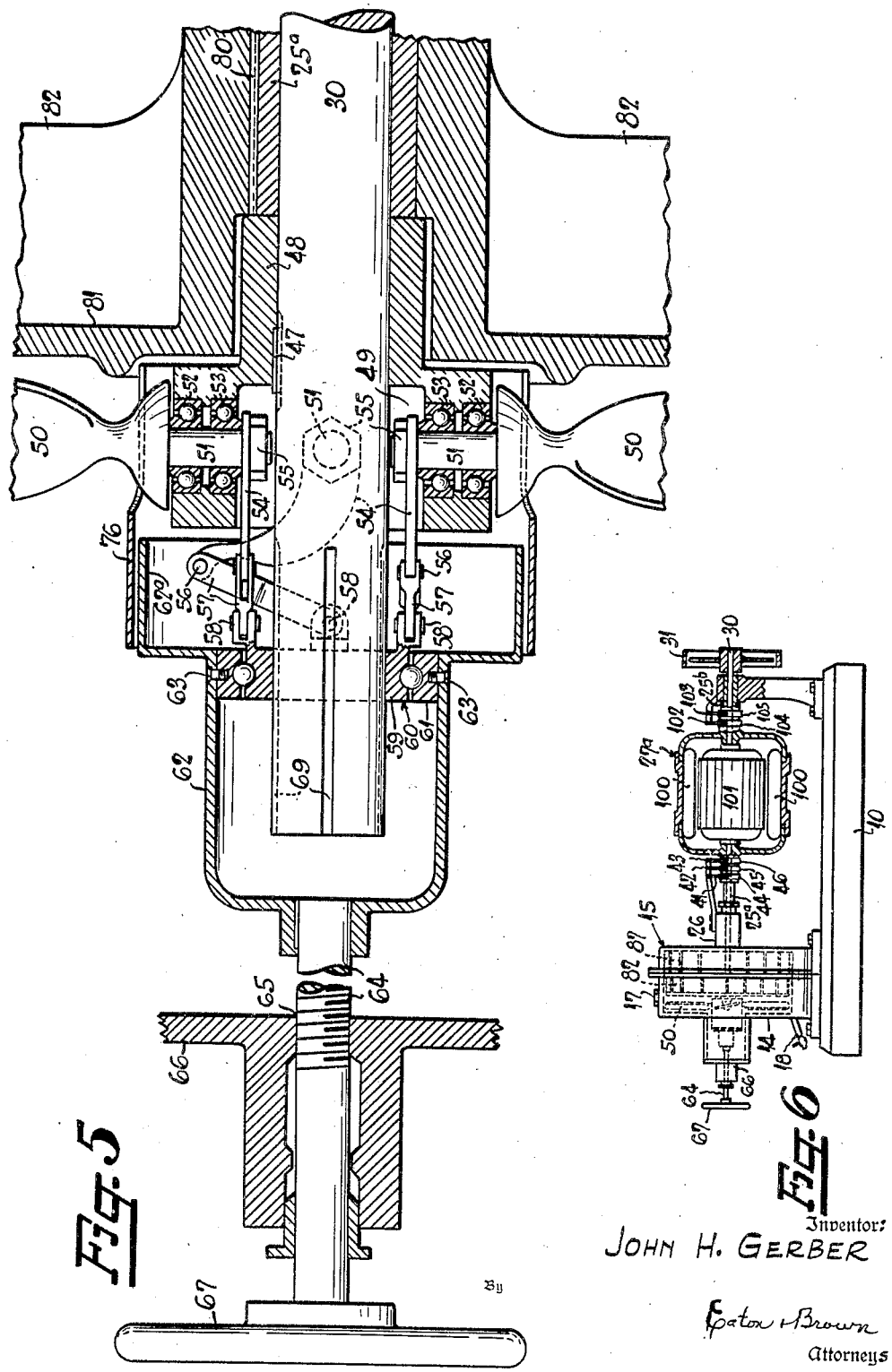

Patented July 13, 1943

2,324,074

UNITED STATES PATENT OFFICE 2,324,074

VARIABLE SPEED MECHANISM

John H. Gerber, Charlotte, N. C.

Application January 9, 1942, Serial No. 426,141

4 Claims. (Cl. 188—90)

This invention relates to a differential speed unit and more especially to a unit of the type which is hydraulically operated in association with single or polyphase electrical motors and generators.

It is a well known fact that the stator or primary winding in single or polyphase motors may be held stationary or rotate during operation. Likewise the rotor or secondary winding of either of the above-mentioned types of motors may be held stationary or allowed to rotate. Therefore, if both primary and secondary windings are allowed to rotate during operation, the difference in speed between the two windings will be substantially a constant value. For example, a four pole induction motor, three phase, sixty cycle will operate at 1800 R. P. M. synchronous rotor speed, less slippage, when the stator is held stationary. If both the rotor and stator rotate without a retarding action applied to either, the rotor will turn at 900 R. P. M. in one direction while the stator will turn at 900 R. P. M. in the opposite direction. If a retarding action is applied to either the stator or the rotor, the unretarded element will speed up while the retarded element slows down but the total speed of 1800 R. P. M. of the two units will be maintained.

It is an object of this invention to provide a differential speed unit in association with rotatable primary and secondary windings, said unit having hydraulic means for varying the rate of rotation of one of the above-named windings thereby automatically changing the rate of rotation of the other.

The rotatable members upon which the primary and secondary windings are mounted have extensions which extend into a suitable housing which is partially filled with a fluid which may be substantially more than that shown in the drawings. One of the rotatable members has a set of fixed vanes mounted thereon whereas the other rotatable member has an adjacent set of adjustable vanes. Both sets are disposed in the housing and rotate in the fluid. Also a stationary set of vanes are disposed adjacent the fixed set and on the opposite side from the adjustable vanes to thereby provide a constant retarding action upon the rotatable member having the fixed vanes. When it is desired to vary the retarding action upon the rotatable member having the fixed vanes, it is only necessary to vary the pitch of the adjustable vanes while they are rotating in the fluid.

It is another object of this invention to provide an apparatus of the class described which may be employed as a frequency changer for use in connection with high speed machinery such as employed in woodworking plants and the like.

Some of the objects of the invention having been stated, other objects will appear as the description proceeds when taken in connection with the accompanying drawings, in which—

Figure 5 is an enlarged longitudinal sectional view similar to the left-hand portion of Figure 1, illustrating an improved means for adjusting the pitch of the propeller blades which are mounted upon the secondary winding shaft;

Figure 6 is an elevation with certain portions thereof in section, illustrating a slightly modified form of the invention in which the same is employed as a frequency changer.

Figure 1:
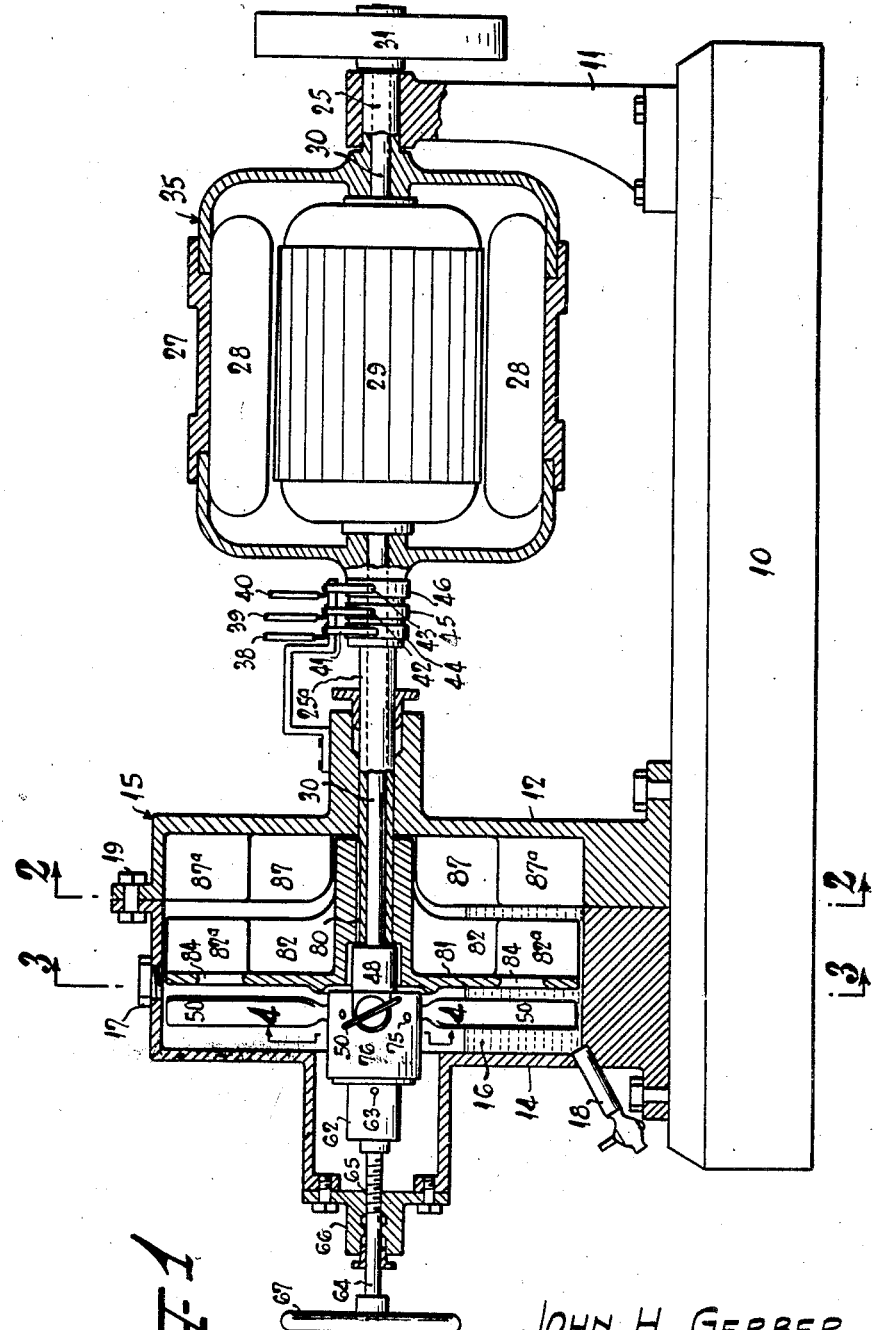
Figure 1 is a longitudinal sectional view through my improved differential speed control in association with a primary and secondary electrical winding.
Figure 2:
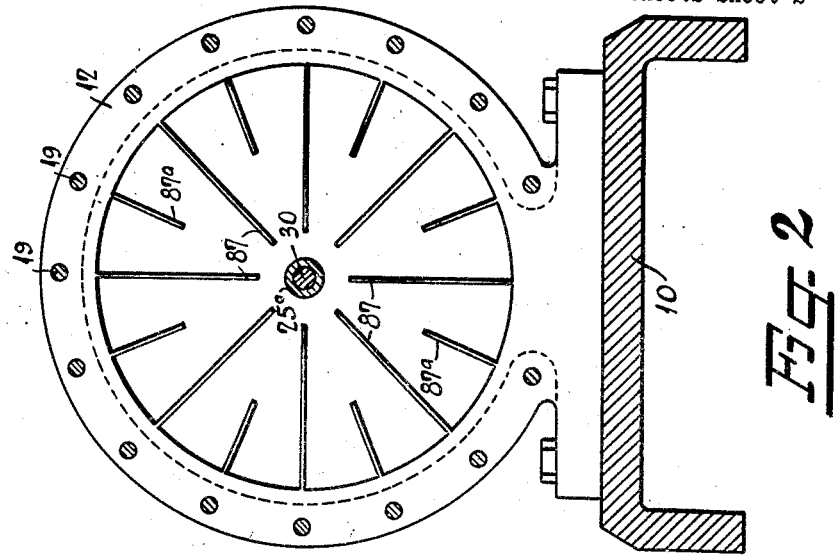
Figure 2 is a transverse vertical sectional view taken along the line 2—2 in Figure 1.
Figure 3:
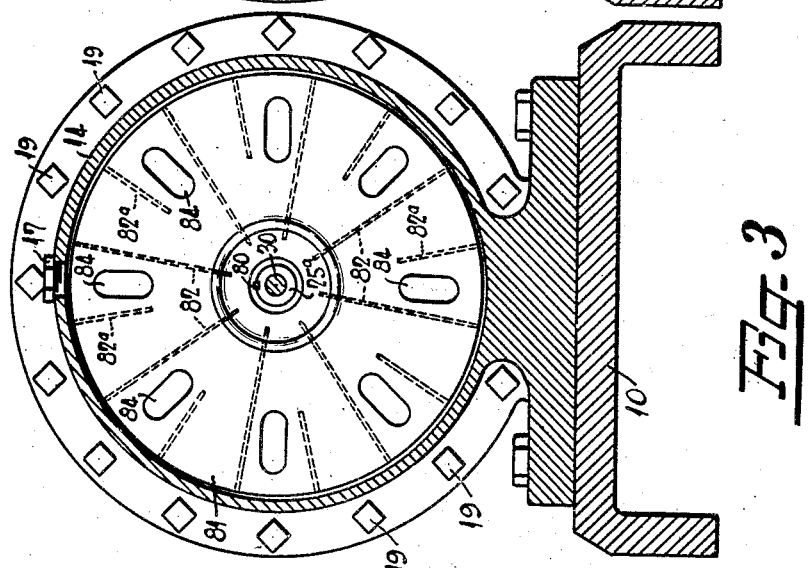
Figure 3 is a vertical transverse sectional view taken along the line 3—3 in Figure 1.

Referring more particularly to the drawings, the numeral 10 denotes a suitable base upon which is mounted a bearing 11 and housing members 12 and 14, said housing members 12 and 14 being broadly designated as a casing 15 for receiving a suitable fluid 16. This casing 15 has an inlet plug 17 through which the fluid 16 is introduced and an outlet conduit 18 through which the fluid is drained. The parts 12 and 14 are fastened together in a face-to-face relationship by any suitable means such as bolts 19.

The upper end of bearing 11 has rotatably mounted therein a sleeve 25. Likewise the central portion of the casing 12 has rotatably mounted therein an alined sleeve 25a as at 26, and interposed between the alined sleeves is a suitable housing 27 having suitable stator or primary electrical windings 28 disposed therein in a conventional manner. The windings 28 are arranged in a circle in such a manner that the interior periphery thereof will be disposed in spaced relation to a secondary or rotor winding 29 disposed upon a shaft 30. This shaft is rotatably mounted in sleeve 25 and extends to the left of winding 29 in Figures 1 and 5 to a point within the casing 15. This same shaft extends to the right of winding 29 to a point beyond bearing 11. Upon the end of the shaft 30 which projects beyond the bearing 11, a suitable pulley 31 is fixedly secured for use as a power take-off.

The housing 27, primary windings 28, and secondary windings 29 are broadly designated as a motor 35. It is seen that both the housing 27 and the rotor 29 are rotatable. In order to supply the necessary current to the various windings, conventional current supply wires 38, 39, and 40 are connected to brushes 41, 42 and 43, said brushes in turn being adapted to contact brush rings 44, 45 and 46, respectively on the exterior of sleeve 25a. Suitable wires, not shown, are conventionally connected to rings 44, 45 and 46 and the stator windings 28.

Rotor propeller and adjustable pitch mechanism

Figure 4:
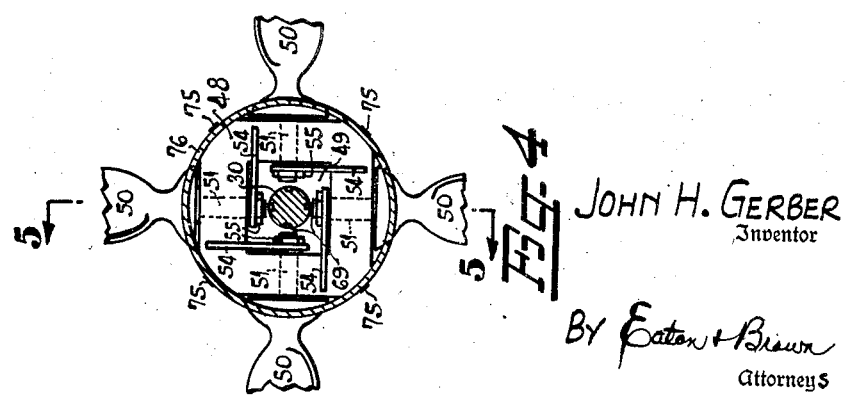
Figure 4 is a transverse sectional detail view taken along the line 4—4 in Figure 1.

By referring to Figures 1 and 5, it will be seen that the extreme left-hand end of shaft 30 has fixedly secured thereon as at 47, a suitable hub member 48. This hub has a substantially square cavity 49 disposed in the left-hand face thereof (Figure 4) and the exterior periphery of this hub member has sides substantially parallel to the inner sidewalls of the square cavity. Extending radially from the hub 49 are a plurality of propeller vanes 50, each of the vanes having a spindle 51 on the inner end thereof which spindle is mounted for axial rotation in suitable ball bearings 52 and 53. The spindles 51 extend inwardly into the cavity 49 and have fixedly secured thereon suitable levers 54 by any suitable means such as nuts 55, said levers extending to the exterior of the cavity 49 and outwardly from the shaft 30. Each lever has pivotally secured to the free end thereof as at 56, one end of a link 57 and this link has its other end pivotally secured as at 58 to inner race 59 of a suitable ball bearing broadly designated by the reference character 60. This ball bearing has an outer race 61 to which is secured a suitable housing 62 by any suitable means such as screws 63. Fixedly secured to the left-hand end of housing 62 (Figures 1 and 5) is the inner end of a shaft 64, said shaft 64 being threadably secured as at 65 in housing end plate 66. From the plate 66 the shaft 64 projects to the exterior and has a suitable hand wheel 67 fixedly mounted thereon. It will be noted that the inner race 59 of the ball bearing 60 is splined upon the left-hand end of shaft 30 (Figure 5) there being suitable keyways 69 provided in the shaft for that purpose.

When it is desired to vary the pitch of the propeller blades 50, it is only necessary to turn the hand wheel 67 and this turning will produce axial as well as rotative movement of the shaft 64, housing 62 and bearing race 61. As the bearing 60 moves longitudinally of the shaft 30, the overall length of links 54 and 57 will be changed, thereby rotating the spindles 51 and propeller blades 50. For example, let us suppose that we desire to increase the pitch of the propeller blades 50 in Figure 5. To increase the pitch, it is necessary to turn the hand wheel 67 in such a direction that the bearing 60 and associated housing 62 will move to the left on splined shaft 30. This movement increases the overall length of the links 57 and 54 to thereby rotate the spindles 51 and associated propeller blades 50 to a position where a greater amount of liquid 16 will be contacted by the blades rotating within the casing 15. It will be further noted that this adjustment may be made while the machine is in operation, because of the special construction of bearing 60.

The outer periphery of the hub member 48 has secured thereto as at 75, a suitable circular housing 76. By observing Figure 5, it will be seen that housing 76 is telescopically mounted over portion 62a of housing 62 to thereby cover the propeller operating mechanism which is disposed adjacent the shaft 30. Portion 62a extends within the housing 76 for a substantial distance thereby permitting housing 62 to move to the left a substantial amount without uncovering the propeller pitch actuating mechanism previously mentioned. It should be kept in mind that the propeller blades 50 are fixedly secured upon rotor shaft 30 and are therefore adapted to turn with the secondary windings 29.

Stator propeller

The sleeves 25 and 25a, housing 27 and primary windings 28 are adapted to turn in an opposite direction to the direction of rotation of shaft 30 and secondary winding 29. The left hand end of sleeve 25a (Figures 1 and 5) has fixedly keyed thereon as at 80, a circular disk 81, said disk having a plurality of radially disposed vanes 82 and 82a integral therewith and extending to the right in the casing 15. The periphery of the disk 81 is adapted to fit in close proximity to the interior periphery of the casing 15, but with sufficient clearance to permit a certain amount of fluid leakage from one side of the disk to the other. This leakage is further provided by having suitable holes 84 in the body of the disk. The vanes 82 and 82a occupy a fixed position relative to the disk and are not susceptible to variation. During the rotation of the sleeves 25 and 25a, these vanes engage liquid 16 within the casing 15 which in turn forces the liquid 16 to the right of disk 81 (Figure 1) to thereby cause resistance to be offered to the turning of the sleeves and primary windings. As the pitch of blades 50 is increased, the depth of fluid in the right-hand portion of casing 15 will increase, resulting in a greater retarding effect upon the rotation of the primary windings.

As a means for providing further resistance to the turning of the primary windings 28, a set of vanes 87 and 87a are provided in the housing 12, the left hand edges of vanes 87 and 87a being disposed in close proximity to the right-hand edges of vanes 82 and 82a previously described.

Let us assume that the member 45 is a standard four pole induction motor, 3 phase, 60 cycles, and which ordinarily operates at a speed of 1800 R. P. M. synchronous speed when one of the windings 28 or 29 is held stationary. If both windings are free to turn without any retarding movement, one winding will rotate at 900 R. P. M. in one direction while the other rotates at 900 R. P. M. in the opposite direction, but at the same time a relative or differential speed of 1800 R. P. M. less the slippage will be maintained. In the present disclosure, it is desirable to variably retard one of the windings so that a variation of speed may be obtained. For example when it is desired to cause the pulley 31 and shaft 30 to rotate at a slower speed, then it is necessary to permit the primary winding 28 and its associated structure to rotate at a higher speed. This variation is effected by manipulating the hand wheel 67 either while the apparatus is in motion or stationary. The pitch of the propeller blades 50 is set in such a manner that there will be a slowing down of the secondary winding 29 and a resultant speeding up of the primary winding 28.

In the textile industry, there is the spinning frame which has an approximate cylinder speed of 1000 R. P. M. A hydraulic differential drive such as disclosed can be applied in which the motor shaft 30 can be directly coupled and then the rotor 29 would be caused to operate 1000 R. P. M. and the stator or secondary windings 28 would operate at about 750 R. P. M. that is a total difference of 1750 R. P. M. assuming this to be the full load speed of the motor. The above example of drive is based upon present trends of individual drives for spinning frames. Heretofore, in order to obtain the desired 1000 R. P. M. of the spinning frame cylinder, it has been necessary to use a proper ratio of pulleys or sheaves in combination with belts, this being a source of maintenance as well as unsatisfactory. By using the hydraulic differential drive, the driven machine can be started with a hydraulic cushion which results in decided advantages, peculiar to machines of this type, because it is very desirable to start off at a very slow speed so that breakage of yarn ends will be eliminated.

In addition to the above, the hydraulic differential equipped with my motion controlling adjustment of the propeller vanes 50 affords an infinite adjustment of speed of the rotor shaft 30 whereby the speed may be varied from approximately zero to the maximum motor speed depending upon the number of poles and frequency of the motor.

Figure 6 illustrates the invention with slight modifications sufficient to enable the same to be employed as a frequency changer. Variable frequency is used in high speed machinery such as employed in wood working and furniture plants. The structure is essentially as in the preceding form, and therefore like reference characters will refer to like parts without making an additional description. Some changes are involved in the construction of the generator 27a and it is here seen that the generator has suitable rotor or primary winding 100. Within this primary winding a secondary winding 101 is provided upon a shaft 105, which shaft rotates in sleeves 25a and 25b. Brushes 41, 42 and 43 as well as brush rings 44, 45 and 46 are provided as in the preceding form. Additionally, suitable brushes 102 and 103 are provided which operate upon brush rings 104 and 105 so that direct current excitation may be provided. For example, by coupling a prime mover having 3600 R. P. M. directly to a four pole generator equipped with hydraulic differential, the stator 100 is allowed to slip or rotate and will have a tendency to rotate in the same direction as the rotor or secondary winding 101. However, the primary winding or stator 100 will be allowed to rotate at a desired speed or held stationary depending upon the manipulation of hand wheel 67 and the associated propeller blade pitch adjustment heretofore described. In this manner, the frequency can be varied from zero to 120 cycles.

The depth of liquid 16 in the housing 15 will be largely dependent upon a predetermined minimum speed of output shaft 30. In other words, the greater the depth of fluid, the greater will be the initial resistance offered to the turning of stator propellor 82, and consequently the higher the initial speed of shaft 30. If it should be desired to vary the speed from the predetermined minimum, the pitch of the blades 50 is changed accordingly.

In the drawings and specification, there has been set forth a preferred embodiment of the invention, and although specific terms are employed, they are used in a generic and descriptive sense only and not for purposes of limitation, the scope of the invention being defined in the claims.

I claim:

1. In combination, a casing having a fluid therein, a shaft rotatably mounted in said casing, an adjustable pitch propeller fixedly secured upon said shaft for engaging said fluid, a rotatable sleeve surrounding said shaft and extending into said casing, a fixed vane propeller secured upon said sleeve, said fixed vane propeller being disposed adjacent said adjustable pitch propeller, and a stationary set of vanes disposed adjacent said second propeller and on the opposed side from said first propeller.

2. In combination, a casing having a fluid therein, a shaft rotatably mounted in said casing, an adjustable pitch propeller fixedly secured upon said shaft for engaging said fluid, a rotatable sleeve surrounding said shaft and extending into said casing, a fixed vane propeller secured upon said sleeve, said fixed vane propeller being disposed adjacent said adjustable pitch propeller, a stationary set of vanes disposed adjacent said second propeller and on the opposed side from said first propeller, and a partition disposed between said propellers thereby dividing said casing in two compartments, said partition having openings therein to permit fluid to flow therethrough during operation.

3. In combination, a casing having a fluid therein, a shaft rotatably mounted in said casing, an adjustable pitch propeller fixedly secured upon said shaft for engaging said fluid, a rotatable sleeve surrounding said shaft and extending into said casing, a second propeller secured upon said sleeve, said second propeller being disposed adjacent said adjustable pitch propeller and a stationary set of vanes disposed adjacent said second propeller and on the opposite side from said first propeller.

4. In combination, a casing having a fluid therein, a shaft rotatably mounted in said casing, an adjustable pitch propeller fixedly secured upon said shaft for engaging said fluid, a rotatable sleeve surrounding said shaft and extending into said casing, a second propeller secured upon said sleeve, said second propeller being disposed adjacent said adjustable pitch propeller, a stationary set of vanes disposed adjacent said second propeller and on the opposed side from said first propeller, and a partition disposed between said propellers thereby dividing said casing in two compartments, said partition having openings therein to permit fluid to flow therethrough during operation.

JOHN H. GERBER.